US008667549B2

(12) United States Patent
Reneris

(10) Patent No.: US 8,667,549 B2
(45) Date of Patent: Mar. 4, 2014

(54) PERSONAL VIDEO RECORDER E-MAIL ALERTS AND STATUS

(75) Inventor: Kenneth S. Reneris, Clyde Hill, WA (US)

(73) Assignee: Microsoft Corporation, Redmond, WA (US)

(*) Notice: Subject to any disclaimer, the term of this patent is extended or adjusted under 35 U.S.C. 154(b) by 1090 days.

(21) Appl. No.: 12/431,177

(22) Filed: Apr. 28, 2009

(65) Prior Publication Data

US 2010/0272414 A1 Oct. 28, 2010

(51) Int. Cl.
*H04N 7/173* (2011.01)

(52) U.S. Cl.
USPC ............... 725/121; 725/86; 725/89; 725/107

(58) Field of Classification Search
USPC ................ 725/37–61, 86, 89, 107, 121
See application file for complete search history.

(56) References Cited

U.S. PATENT DOCUMENTS

| | | | |
|---|---|---|---|
| 6,968,364 B1* | 11/2005 | Wong et al. | 709/217 |
| 7,143,429 B2* | 11/2006 | Mineyama | 725/58 |
| 2002/0054750 A1* | 5/2002 | Ficco et al. | 386/46 |
| 2003/0084335 A1* | 5/2003 | Moran et al. | 713/200 |
| 2003/0237090 A1* | 12/2003 | Boston et al. | 725/37 |
| 2004/0103434 A1 | 5/2004 | Ellis | |
| 2005/0160308 A1* | 7/2005 | Elcock et al. | 714/5 |
| 2005/0273819 A1* | 12/2005 | Knudson et al. | 725/58 |
| 2006/0117040 A1 | 6/2006 | Begeja | |
| 2006/0140584 A1 | 6/2006 | Ellis | |
| 2006/0277272 A1 | 12/2006 | Cantalini | |
| 2007/0050818 A1* | 3/2007 | Berger et al. | 725/58 |
| 2007/0079335 A1 | 4/2007 | McDonough | |
| 2007/0115389 A1 | 5/2007 | McCarthy | |
| 2007/0124779 A1 | 5/2007 | Casey | |
| 2007/0157281 A1* | 7/2007 | Ellis et al. | 725/134 |
| 2007/0168539 A1 | 7/2007 | Day | |
| 2007/0188902 A1* | 8/2007 | Patron et al. | 360/31 |

(Continued)

FOREIGN PATENT DOCUMENTS

WO WO0165862 9/2001

OTHER PUBLICATIONS

Providing Advanced Video Services on an Open Broadband Architecture, Alcatel Telecommunications Review, 2nd Quarter 2003.

(Continued)

*Primary Examiner* — Scott Beliveau
*Assistant Examiner* — Alexander Q Huerta
(74) *Attorney, Agent, or Firm* — Micah Goldsmith; David Andrews; Micky Minhas

(57) ABSTRACT

A web-based service which provides a notification such an email to a user to facilitate managing the recording of broadcast content using a personal video recorder (PVR). The user can agree to participate in the service in exchange for emails which can provide information such as a summary of programs recorded over a few days, missed recordings, and scheduling conflicts. The notification can include targeted recommendations, targeted advertising and information about recording habits of members of a social network of the user. A notification can be provided on an urgent basis if program schedule conflicts or hardware or software problems with the user's equipment are detected. The user's equipment can include a PC-based PVR, or a PC which communicates with a separate PVR device. PC-related information such as events thrown can also be reported up to the web service.

17 Claims, 11 Drawing Sheets

(56) References Cited

U.S. PATENT DOCUMENTS

| | | |
|---|---|---|
| 2007/0220554 A1 | 9/2007 | Barton |
| 2007/0240187 A1 | 10/2007 | Beach |
| 2008/0016196 A1 | 1/2008 | MacMillan |
| 2008/0114905 A1 | 5/2008 | Chen |
| 2008/0168503 A1 | 7/2008 | Sparrell |
| 2008/0168513 A1 | 7/2008 | Cha |
| 2008/0208752 A1 | 8/2008 | Gottlieb |
| 2008/0209469 A1 | 8/2008 | Gottlieb |
| 2008/0222044 A1 | 9/2008 | Gottlieb |
| 2008/0232783 A1 | 9/2008 | Boston |
| 2008/0247730 A1 | 10/2008 | Barton |
| 2009/0010612 A1 | 1/2009 | Allen |
| 2009/0142036 A1* | 6/2009 | Branam et al. .................. 386/83 |
| 2009/0142042 A1* | 6/2009 | Branam ......................... 386/124 |
| 2009/0150925 A1* | 6/2009 | Henderson ...................... 725/34 |
| 2009/0172457 A1* | 7/2009 | Gnanasambandam et al. ............................. 713/600 |
| 2010/0071000 A1* | 3/2010 | Amento et al. .................. 725/39 |
| 2010/0088291 A1* | 4/2010 | Bhogal et al. .................. 707/705 |
| 2010/0107194 A1* | 4/2010 | McKissick et al. ............. 725/40 |
| 2010/0131969 A1* | 5/2010 | Tidwell et al. .................. 725/14 |
| 2010/0158477 A1* | 6/2010 | Kummer ......................... 386/83 |
| 2011/0078744 A1* | 3/2011 | Adimatyam et al. ........... 725/58 |

OTHER PUBLICATIONS

Samsung SMO 152QN 15" Network Monitoring System (SMO-152QN), http://www.solidsignal.com/prod_display.asp?PROD=SMO-152QN, printed Jan. 29, 2009.

TiVo's Mobile Interface Gets Things Recording on the Go, louisgray. conn, Silicon Valley Blog, Nov. 28, 2008.

Another Reason to Give Thanks—A Free, New Mobile Web Site Puts TIVO Scheduling in the Palm of your Neighbor's Hand, Everyone's Hand, Tivo Press Release, Nov. 25, 2008.

* cited by examiner

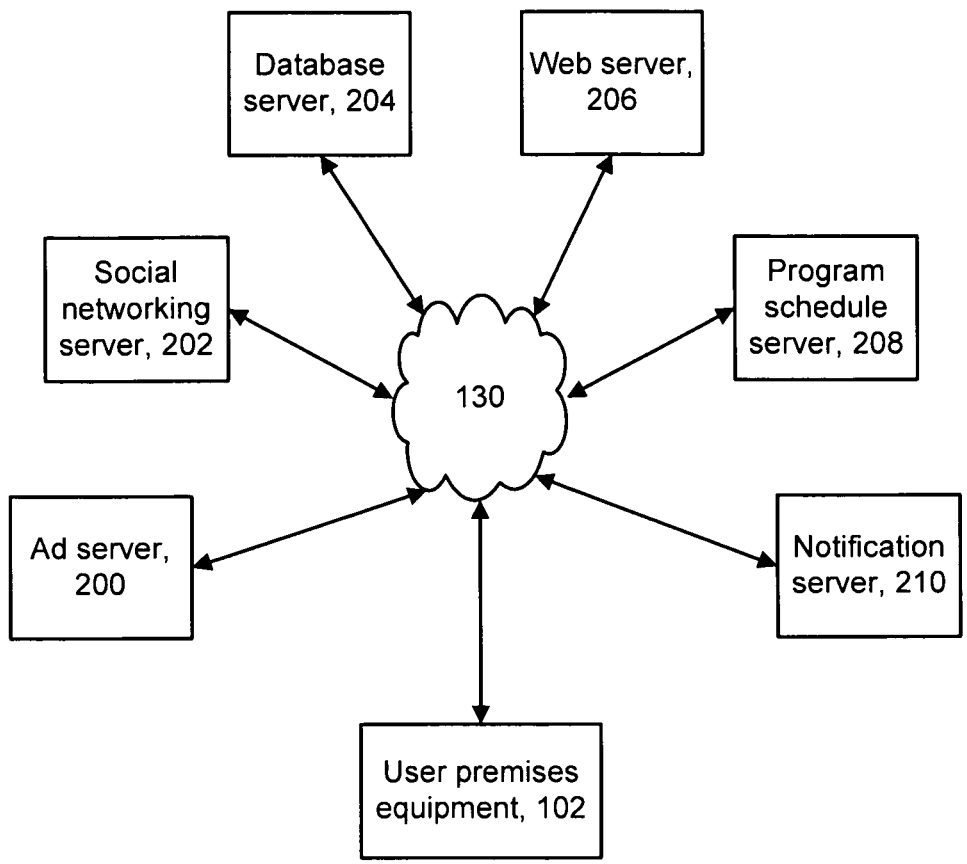

Fig. 3

○ I agree to sign up for the web-based PVR reporting service ← 302

Identify your system: ← 304
○ PC/PVR
○ PC connected to separate PVR

PC Operating System ← 306
○ OS1   ○ OS2

PVR model ← 308
○ Model A   ○ Model B

[ Click here to enter info for additional devices ] ← 310

Reporting time: ← 312
○ [ 2am ▼ ]
○ Auto

Notification settings:
○ Once per week on [ Mon ▼ ]   ○ Every [ 1 ▼ ] days ← 314

My contact info
email address: _____   cell phone: _____ ← 316

Social network settings: ← 318
I am a member of:
○ Facebook   ○ MySpace
user name: _____
password: _____

[ submit entries and download software ] ← 320

This is a routine notification from the web-based PVR reporting service
This notification covers 2/1/09 to 2/8/09

801

| Advertisement |
|---|

The following requested programs were not recorded (click to select): ⌐ 802

| Program: | Reason: | Options: |
|---|---|---|
| To Kill a Mockingbird | schedule change | View on web |
| | | Order DVD |
| | | Order pay-per-view |
| | | (Recording was rescheduled for 2/11/09 at 3pm on NBC) |

803

The following requested programs will not be recorded:

| Program: | Reason: | Options: |
|---|---|---|
| Family Guy | schedule conflict | Resolve |

804

The following programs were recorded:

| Program: | Date: |
|---|---|
| Lost | 2/1/09 |
| Grey's Anatomy | 2/2/09 |
| Mr. Belvedere | 2/4/09 |
| Video bloopers | 2/7/09 |

⌐ 805
Check your deleted programs

⌐ 806
Check your soon-to-be deleted programs next page

This is a routine notification from the web-based PVR reporting service
This notification covers 2/1/09 to 2/8/09

We recommended (click to record): 808
North by Northwest    2/15/09 at 11:00pm on TNT Most popular in your group (click to record): 810
Saturday Night Live
Lost(*)
Survivor What's on Jim's PVR? (click to record): 812
Heroes
Scrubs Jim recommends (click to record): 814
Heroes

This is a routine notification from the web-based PVR reporting service

824

This notification covers 2/1/09 to 2/8/09

The following programs were recorded:

| Program: | Date: | Device: | Health: |
|---|---|---|---|
| Lost | 2/1/09 | PVR in family room | ok |
| Grey's Anatomy | 2/2/09 | PVR in child's bedroom | ok |
| Mr. Belvedere | 2/4/09 | Dad's PC | ! |
| Video bloopers | 2/7/09 | PVR in family room | ok |
| Dr. Doolittle | 2/8/09 | Home Server PVR | ok |

826

[ sort by device ]

This is a routine notification from the web-based PVR reporting service

This notification covers 2/1/09 to 2/8/09

834

The following programs were recorded:

| Program: | Date: | Device: |
|---|---|---|
| Lost | 2/1/09 | PVR in family room |
| Video bloopers | 2/7/09 | PVR in family room |

836

| Program: | Date: | Device: |
|---|---|---|
| Grey's Anatomy | 2/2/09 | PVR in child's bedroom |

838

| Program: | Date: | Device: |
|---|---|---|
| Mr. Belvedere | 2/4/09 | Dad's PC |

839

| Program: | Date: | Device: |
|---|---|---|
| Dr. Doolittle | 2/8/09 | Home Server PVR |

[ group all devices ]  840

Fig. 9

This is a schedule conflict notification from the web-based PVR reporting service

[Advertisement] — 902

904 →
The following programs are in conflict:

| Program: | Date: | Time: | Select program: |
|---|---|---|---|
| MLB Giants vs. Dodgers | 2/3/09 | 7:00-10:00pm | ○ |
| Family Guy | 2/3/09 | 9:00-10:00pm | ○ |

↖ 908

[submit] — 906

Fig. 10

This is a health status notification from the web-based PVR reporting service

[Advertisement] — 1002

1004 →
The following problem has been detected:

| Problem: | Date: | Time: | Suggested Action: |
|---|---|---|---|
| PC not reporting | 2/7/09 | 3:00am | check PC power and Internet connection |

PERSONAL VIDEO RECORDER E-MAIL ALERTS AND STATUS

BACKGROUND

Personal Video Recorders (PVRs), also referred to as Digital Video Recorders (DVRs), store broadcast television programs in a digital format for later viewing by a user. PVRs can receive broadcast signals from a number of sources, including a connection to a cable television headend, a satellite dish, or an antenna for receiving terrestrial signals. Bundled services are also becoming increasingly popular. Such services combine Internet, telephone, and television services using Ethernet Internet Protocol (IP) broadcast packets sent to a user's home over fiber, copper twisted pair or coax. FiOS®, or Fiber Optic Service, of Verizon Corp., is one example. These broadcasts are likely to grow in popularity with the content providers as the hardware to receive and route IP packets has become relatively inexpensive.

Typically, the user configures the PVR using an on-screen interface and a handheld remote control to select particular programs of interest which are to be broadcast at a future time.

Thus, the user can schedule the automatic recording of content in advance of the time that the PVR will receive the content. For example, the user can access an on-screen program guide to select specific programs, such as a movie, special event, or a multi-episode television series. In some cases, the user can select a more generic criterion such as a genre, specified actor or a specified director, in which case the PVR can automatically identify and record matching programs.

PVRs were initially deployed as standalone recording devices, e.g., set-top boxes, which could be leased or purchased from a cable or satellite broadcaster or other supplier. The PVR receives a broadcast signal as an input and provides a video/audio signal to a television as an output. In this configuration, the PVR maintains all programming instructions which are provided by the user via the on-screen interface. Recently, it has become possible to configure a conventional personal computer (PC), e.g., laptop or desktop, as a PVR which tunes and records broadcast signals. A tuner card can be built into the computer or connected as a peripheral, for instance. In this case, the PC receives a broadcast signal as an input and provides a video/audio signal to an attached or detached monitor/screen as an output. Moreover, a PC can be configured as a media center which interacts with a separate PVR device, such as via a local network. The user can use the computer to provide programming instructions to the PVR and otherwise manage the PVR, combine content from the PVR with Internet content and other content on the computer's hard drive, and import data from the PVR to a portable media player, among other functions.

Moreover, home servers are expected to become increasingly popular as well in this context as they offer expanded storage capabilities for broadcast content. MICROSOFT WINDOWS MEDIA CENTER is one example of an application that can be run on a PC to record and manage broadcast video content and the ability to service multiple client devices, such as in different rooms of a home. Using a PC to manage a PVR adds functionality due to the enhanced capabilities of the PC versus the PVR, including generally greater processing power and Internet connectivity.

Although PVRs are reasonably reliable, occasionally the PVR will act in an unexpected way. For example, a recording may be missed for various reasons, such as a hardware or software problem or schedule change. PC-based systems are susceptible to their own system failures that increase the likelihood of missed recordings. This problem is exacerbated by the fact that many PVRs go unchecked by their owners for long periods, such as a week or more. When the user finally attempts to catch up with favorite programs, he or she can become frustrated if they are not available.

Improved techniques are needed for managing the recording of broadcast content.

SUMMARY

A web-based service is provided which provides notifications to a user to facilitate managing the recording of broadcast content.

In one embodiment, a computer-implemented method for providing information regarding broadcast video content is provided. The method includes receiving, at one or more servers, via a wide area network, information from a standalone computer, where the standalone computer: (a) records broadcast video content or (b) communicates locally with a video recorder which records broadcast video content, and the information identifies broadcast video content which has been scheduled to be recorded or has been recorded. The method further includes storing the information at the one or more servers, and accessing, at the one or more servers, notification settings associated with a user of the standalone computer. The method further includes, based on the stored information and the notification settings: (a) providing a routine notification to the user according to a notification schedule, where the routine notification provides a summary of recording operations for the broadcast video content, and (b) providing an urgent notification to the user at a time which differs from the notification schedule when the information from the standalone computer is not received by an expected time. The recording operations can include any aspect involving scheduling or recording of the broadcast video content, such as requested programs which are not yet recorded, requested programs that have been recorded, and requested programs that will not be recorded, e.g., due to a conflict.

In another embodiment, a computer-implemented method for providing information regarding broadcast video content is provided. The method includes receiving, at one or more servers, user instructions which identify: (a) an agreement by a user to participate in a web-based notification service, and (b) notification settings. The method further includes creating an account for the user in response to the user instructions. The method further includes receiving, at the one or more servers, via a wide area network, information from a standalone computer, where the standalone computer: (a) records broadcast video content or (b) communicates locally with a video recorder which records broadcast video content, and where the information identifies broadcast video content which has been recorded. The method further includes storing the information at the one or more servers, indexed to the account, accessing the notification settings at the one or more servers, and based on the stored information and the notification settings, providing a notification to the user which provides a summary of recording operations of the broadcast video content.

In another embodiment, computer readable storage is provided having computer readable software embodied thereon for programming at least one processor to perform a method for providing information regarding user premises equipment which records broadcast video content. The method includes configuring a standalone computer of the user premises equipment to participate in a web-based notification service for the user premises equipment. The method further includes, pursuant to the web-based notification service: (a)

transmitting, to one or more servers, according to a reporting schedule, via a wide area network, information from the standalone computer of the user premises equipment which identifies broadcast video content which has been scheduled to be recorded or has been recorded by the user premises equipment, and (b) transmitting, to the one or more servers, at a time which differs from the reporting schedule, via the wide area network, information from the standalone computer of the user premises equipment which identifies a problem with the user premises equipment, and which triggers a notification process to a user.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 2 depicts different servers of a web-based PVR notification service.

FIG. 3 depicts an example user interface which allows a user to sign up for a web-based PVR notification service.

FIG. 8a depicts an example routine notification from a web-based PVR notification service.

FIG. 8b depicts a further part of the example routine notification of FIG. 8a.

FIG. 8c depicts an example routine notification from a web-based PVR notification service where information from multiple PVRs is provided.

FIG. 8d depicts another example routine notification from a web-based PVR notification service where information from multiple PVRs is provided.

FIG. 9 depicts an example schedule conflict notification from a web-based PVR notification service.

FIG. 10 depicts an example health status notification from a web-based PVR notification service.

DETAILED DESCRIPTION

Figure 1:
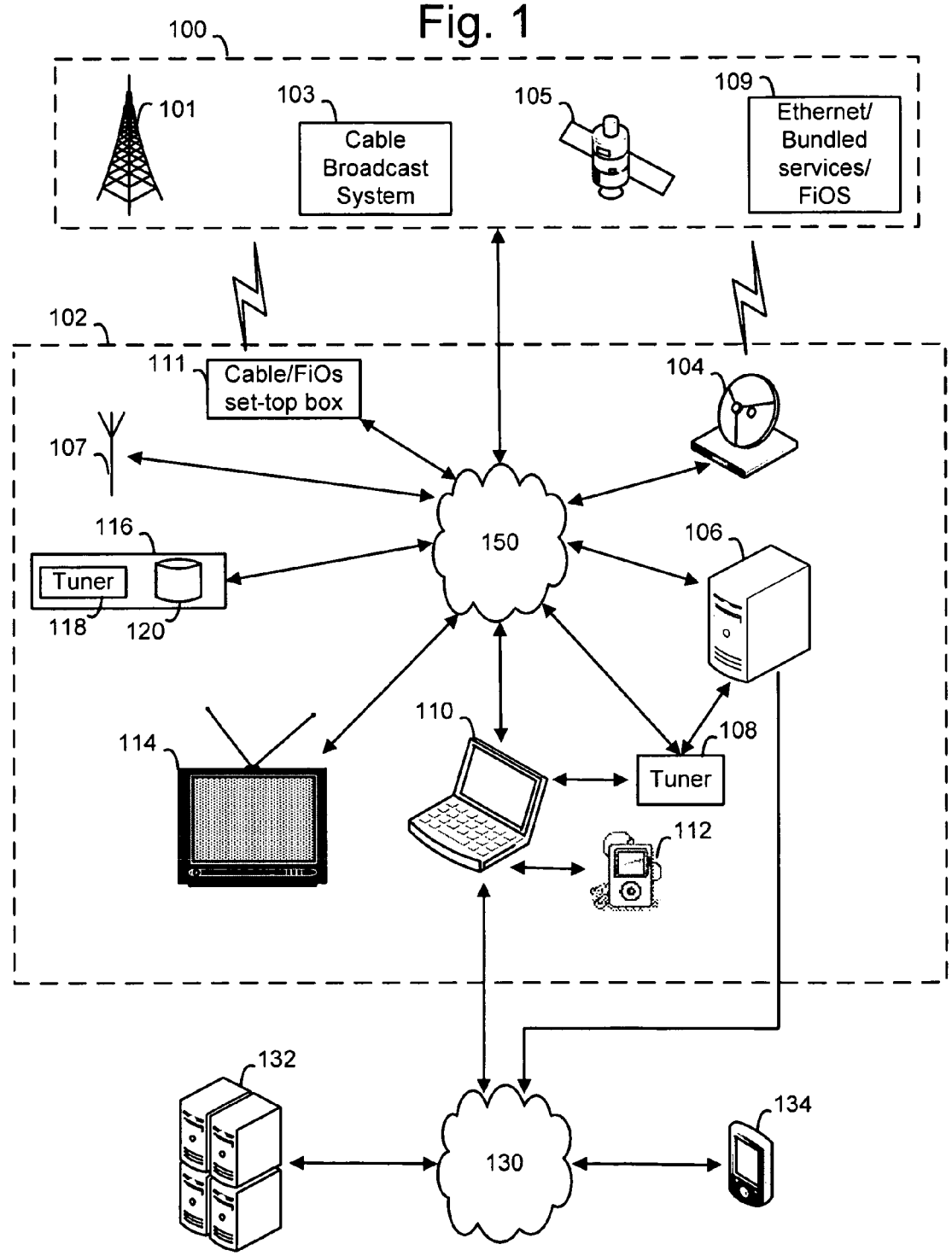
FIG. 1 depicts a system in which broadcast signals are delivered to, and stored at, user premises equipment.

A web-based service is provided which provides notifications, such as email notifications, to a user to facilitate managing the recording of broadcast content. A system for recording broadcast content at a user's home or other premises can include a personal computer (PC) which acts as a standalone PVR, or which interacts with a separate PVR device. The user can subscribe to the service, e.g., opt-in, to obtain: (1) routine notifications from time to time which provide information such as a summary of programs which have been recorded recently, promotions and recommendations, and (2) more immediate notifications of pressing PVR issues of higher user importance. The more immediate notifications can indicate that there is some type of problem. In addition, the user can be informed of upcoming broadcast programs which may be of interest, e.g., news, features, and events, as well as offers to purchase content which can be delivered via the broadcast signal, such as a video-on-demand movie, or which can be delivered via another way, such as a DVD of a movie which is mailed to the user, or a file of the movie which is downloaded via the Internet. Thus, there is also significant advertising and marketing potential.

Moreover, the notifications can provide a user with a more social experience, such as by informing the user of what other users in a group are watching/recording or recommending. For instance, the most recorded, or to-be recorded, programs can be identified. The notifications can also provide status information regarding the PVR, PC and other system hardware.

One possible solution integrates the end-user's PVR to a highly reliable web service that can be subscribed to, and that aggregates information from many sources and generates notifications by email or other electronic communications. A PC/PVR periodically reports to a server to identify the programs it has recorded or is scheduled to record. Periodic notifications can include PVR status, promotions, suggestions, and other useful information. Moreover, more timely notifications can be provided when a potential problem has been detected, such as scheduling conflicts or system behavior problems, such as the system not reporting its status due to being offline or a disk error. These notifications fit with the consumption model that email provides. Namely, emails are consumed quasi-frequently when the user has decided to dedicate his time to catching up on personal information, and emails provide for relatively rich content that can include image and URL links for resolving minor issues or accessing additional information and services. Other notification methods could be offered to the user as well, such as cell phone SMS style text messaging. It is also possible to have notifications with different degrees of urgency, and different communication modes based on the degree of urgency. For example, a routine notification may be sent via email at a normally scheduled time, while an urgent notification can be sent via an immediate email, and a very urgent notification can be sent via a cell phone text message, a computer instant message and/or a voicemail message (including an automatically generated live phone call). A degree of urgency could also be noted by an "urgent" flag, color coding, or the like in the email or text message.

Moreover, various aggregated data results for the user could be provided back to the PVR clients to offer local interactive experiences. The idea here is that once the user opts in to the web service, the local client could provide recommendations, and social experiences, such as "What's the top most recorded/watched show," "What's the top most recommended show in the user's group of friends?" and so forth. It is convenient for the user to be able to access this information such as while looking at a program guide on the TV/computer monitor.

In one possible approach, the PC runs a multimedia management application such as MICROSOFT MEDIA CENTER which is modified to allow a user to register an email account, either directly or perhaps indirectly, e.g., via a WINDOWS LIVE account, to receive periodic notifications/status reports. Various options may be presented that include the frequency of reports and the types of notifications desired. By completing a form, the client is subscribed to the web-based service. The service negotiates an account-id, client-id, notification settings, and fail-safe data. The fail-safe data is used to ascertain whether the PC/PVR has been powered off or has otherwise stopped working. Some type of some agreement can be established with the server as to when the PC/PVR will contact it so that the server can determine when the PC PVR is having a problem.

Once subscribed, the service can periodically (such as at EPG download time or other designated times) export and upload local lineups, recording requests, current scheduling conflicts, recently watched recordings, and other status information (disk performance, etc. . . . ) necessary for the web service to aggregate useful data. The uploaded client state is queued to the account-id. The client-id is moved in the fail-safe pending queue to its next fail-safe report date. A server processes the uploaded client state to identify any urgent issues, such as any new scheduling conflict that was not present before in the client's profile. If there is an important issue, a full account-state-aggregation is queued for processing. If there is a new Client-Quality-And-Status state for the client, the client downloads it to provide local user interface behavior (that more or less matches the latest account email sent).

In an account-state-aggregation process, a check is made to make sure there has been sufficient time since the last process of this account. If so, each client state assigned to the account is processed to generate a new Client-Quality-And-Status state. All client states are processed to generate a new Account-Quality-And-Status state. An email is queued for the new Account-Quality-And-Status state. A periodic task on the server is run to locate periodic scheduled queued Accounts (for the current date) to place them into the processing queue, and to queue them into their next periodic processing time. Another periodic task on the server is run to locate any pending fail-safe client-ids that have expired and to queue a urgent empty/off-line state for the client-id to be processed.

The web-based service provides a compelling way to get usage information from the user, thus providing the ability to aggregate and provide new features.

FIG. 1 depicts a system in which broadcast signals are delivered to, and stored at, user premises equipment. Broadcast video content sources 100 can include one or more of a terrestrial television antenna 101, a cable broadcast system 103, a satellite transmitter 105, and a FiOS/Ethernet broadcast system 109. At a user's premises 102, such as a home or office, a number of devices can be provided for receiving the broadcast content. These include a cable/FIOS set-top-box 111, a TV antenna 107 and a satellite receiver 104. The user premises equipment can also include a PVR 116, which includes a tuner 118 and a digital storage medium 120 such as a disk drive. A standalone computer 110, such as a personal computer (PC), e.g., laptop or desktop computer, may be configured with a multimedia management application to communicate with the standalone PVR 116, to provide commands to the PVR and to receive data from the PVR. For example, the standalone PVR 116 may perform some tasks autonomously while the standalone computer 110 has the ability to communicate with the PVR using an appropriate protocol and provide commands such as to schedule a recording and delete a recording.

The standalone computer 110 or a home server 106 may also have its own tuner 108 which it uses to tune broadcast signals so that it embodies a PVR by itself. For example, the tuner 108 may be installed as an internal card of the standalone computer 110, or as a local peripheral. The server 106 can be a home server PVR which can be used to record/download all content, where the PVR is accessible to all the devices in the home, such as video game consoles (Xbox), PCs, portable devices, and so forth.

A portable media player 112, such as an MP3 player (e.g., APPLE IPOD, MICROSOFT ZUNE), may be detachably connected to the standalone computer 110 via a USB port, for instance, to download broadcast video content from time to time as desired by a user through use of an appropriate download application. A television monitor 114 may be provided to display video signals from the PVR 116 and/or the standalone computer 110. A server 106 may also be provided for storing the received broadcast content. Moreover, some or all of the components of the user premises equipment 102 may communicate with one another via a local area network or other connections, such as s-video and coax cable, collectively denoted by the cloud 150. A LAN can use the Ethernet standard.

Further, the standalone computer 110 may communicate with one or more servers 132 via a wide area network 130, such as the Internet. One or more portable/mobile devices 134, such as a cell phone or personal digital assistant (PDA), may also be provided to allow a user to interact with the system.

Note that if the standalone computer 110 is recording broadcast programs, it must be powered on and running when the requested programs are being broadcast. However, if the separate PVR 116 is recording the programs, the standalone computer can communicate with the PVR from time to time to determine whether a program has been successfully recorded and to receive information such as health status information. For example, the standalone computer and the PVR may communicate via a local area network.

FIG. 2 depicts different servers of a web-based PVR notification service. In the figures, like-numbered elements correspond to one another. The user premises equipment 102 and one or more servers may communicate with one another via the network 130. It is also possible for some of the servers to communicate with one another via a separate local area network, such as when they are co-located. Typically, a PC/PVR is configured to periodically communicate with a web-based server to download electronic program guide (EPG) and other meta data, such as via a dial up or broadband link. A PC/PVR refers to, e.g., a PC with a PVR capability, a PC which works with a separate PVR, or a separate PVR. As described further below, in a web-based notification service, the user premises equipment periodically reports information to a web server 206. This represents a front end server which takes in the information from the user premises equipment and may coordinate with the other servers. For example, a database server 204 can be used to store the information which is received from the user premises equipment as well as other data which is necessary for providing the web-based notification service. A social networking server 202 can store information relating to a social network of the user. An ad server 200 can store information such as advertisements which are displayed to the user in notifications. A program schedule server 208 can store information regarding program schedules for the broadcast content. Finally, a notification server 210 can provide notifications to a user at scheduled times or as needed, e.g., in the form of an e-mail, text message, instant message or voice-mail.

FIG. 3 depicts an example user interface which allows a user to sign up for a web-based PVR notification service. In some cases, a PVR is leased, purchased or otherwise provided to the user with a contractual requirement by which the provider obtains information regarding the user's viewing habits. In such cases, the user is required to allow such a data gathering process to occur in exchange for the right to use the PVR. In other cases, the user can obtain a PVR which can be used without such contractual requirements. In these cases, users must be convinced to allow their private viewing information to be accessed in exchange for some benefit. In one possible approach, a web-based PVR notification service can be offered on an opt-in basis, where the users voluntarily sign up and agree to allow their private information to be accessed in exchange for the benefits of the service.

For example, the user interface 300 can be accessed via a web page which the user accesses in order to sign up for the web-based PVR recording service. A region 302 of the user interface includes a radio button or other device which allows the user to indicate his or her agreement to sign up for the service, using a mouse or other pointing device. A region 304 asks the user to identify a type of system which is used at the user premises. For example, the user might indicate whether a tuner is built in or directly connected to a standalone PC, whether a PC is connected to a separate standalone PVR. A region 306 allows the user to specify an operating system which is used on the PC. A region 308 allows the user to specify a model of the PVR. Note that two choices are provided as an example only. A button 310 allows the user to enter additional information when more than one recording device is used at the user premises. For example, multiple PC/PVRs may be used in different rooms in a home. When the button 310 is pressed, the regions 304, 306 and 308 can be cleared so that the user can enter the appropriate information for the additional device, in one approach.

At region 312, the user enters a time at which the standalone computer will report to the web server. Typically, the report involves the standalone computer establishing a connection with the web server and transmitting information, such as by using the TCP/IP protocol. This can be done at a convenient time for the user, such as late at night. Or, the reporting time can be automatically set by the PC or web server if it is not set to a specific time by the user. The reporting could also occur when the PC/PVR downloads updated EPG data. For multiple PC/PVRs, the user could enroll each PC (or device) to an account. Multiple devices could be enrolled by one operation from the user if they are all attached/affiliated with the PC being enrolled.

A region 314 allows the user to provide notification settings, which include how frequently the user will receive routine notifications. For example, the user may elect to receive notifications once per week on a certain day of the week, using a drop down menu or other interface device. Or, the user may elect a certain number of days as an interval between routine notifications. In a region 316, the user enters contact information such as an e-mail address for receiving e-mail notifications, or a cell phone number for receiving text message notifications. It is also possible for notifications to be received by instant messaging.

A region 318 allows the user to enter social network settings. Social networks, such as FACEBOOK, MYSPACE and MICROSOFT LIVE.COM, allow a user to share information with his or her friends. In one possible approach, the user selects one or more social networks which he belongs to and enters his user name and password. The user can select a button 320 in order to submit the entries which were made on the interface 300 to the web server 206 (FIG. 2), and to download software to the standalone computer. The interface 300 could also be accessed again to update the entries without downloading software. The entries define a user profile.

Note that the user may register his email account with the web-based service indirectly such as via a WINDOWS LIVE account.

In another possible approach, instead of the web centric version described above, in the case of a PC/PVR, the user can configure software on the PC, and a small part of that would include a signup option for the web service monitoring/notification features. The PC would already know the tuners or set-top-box connection information and send it to the web service. Or, a separate PVR could be configured to allow the user to directly opt in to the service.

Figure 4:
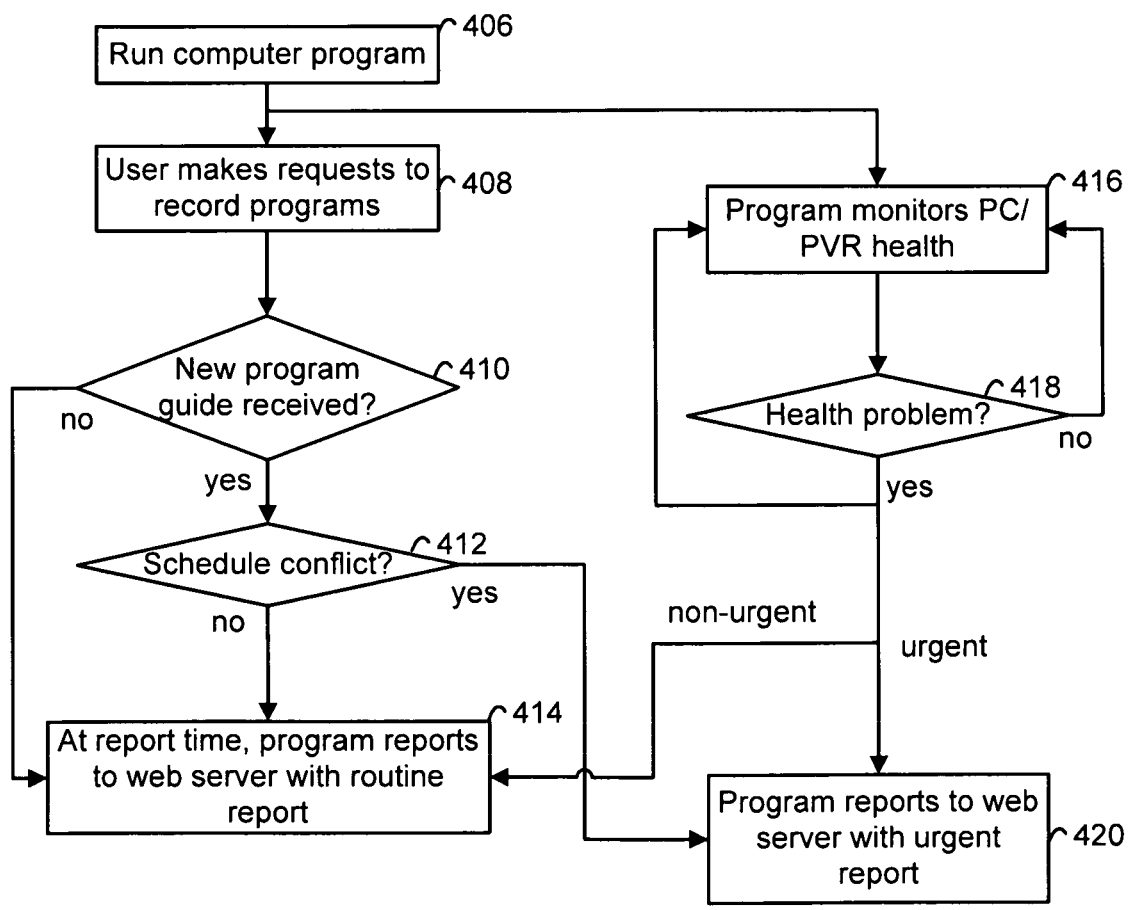
FIG. 4 depicts a process in which a PC/PVR reports information to a server.

FIG. 4 depicts a process in which a PVR is configured to report information to a server. Initially, a user signs up for a web-based PVR notification service. In one approach, software is included in the PC based PVR or standalone PVR which allows the user to access an interface to indicate his assent to enable web service features, e.g., by simply checking a box. The PC based PVR can download information from different locations as needed to implement the service in a manner which is mostly transparent to the user. In another possible approach, the user downloads PC software, and uses that software to fill out a form to sign up for the web service. Or, the user can visit a web site to sign up. In another approach, the software is loaded to the standalone computer locally. For multiple PC/PVRs, the user could enroll each PC (or device) to an account. Multiple devices could be enrolled by one operation from the user if they are all attached/affiliated with the PC being enrolled.

At step 406, the user runs the computer program/software of the web-based notification service such as by launching an application on the standalone computer. The program can run in the background as part of the PC-PVR process so that the standalone computer can be used for other tasks. At step 408 the user makes requests to record programs. At decision step 410, the program determines if a new EPG has been received. The EPG information can be downloaded from the web server or obtained in other ways, such as from a portion of a broadcast signal that encodes EPG data. If no new EPG is received, and at step 414, if a time for reporting data has been reached, the program on the standalone computer initiates a connection and provides a routine report to the web server. The report can include an identification of the requested programs to be recorded, an identification of which of the requested programs were not recorded (missed programs), which of the requested programs were recorded, which programs were recently deleted, which programs are scheduled to be deleted and the scheduled deletion date/time, in addition to health status information for the standalone computer and/or PVR, television programs recommended by the user, and schedule conflicts. When the report includes Internet activity, for privacy reasons, it would likely be limited to only those assets that the web service has aided the user in recording, viewing, or downloading.

The conflict data can be provided by the PC/PVR. The EPG data of the service is used to make recommendations, and to know what programs the user has access to in order to make useful recommendations. The service has other meta data such as data for cross referencing to a DVD box set for a TV series, or to partner websites at which an online version of a program can be found. This meta data can be used to implement the "options" portion of region 802 of FIG. 8a.

The routine report can also include an identifier which is associated with the user, such as an account identifier or a hardware identifier associated with the PC/PVR, to allow the web server to store the received information indexed to the user. The report can also include the local user-id of the user that made the request to record the program, the date/time the requested program was mode, and so forth. This can be useful when a PVR is shared by multiple users, to allow requested programs, for instance, to be associated with a specific user. If a user-id is not available, the date/time can help differentiate among users sometimes.

At decision step 412, if a scheduling conflict exists, the standalone computer reports to the web server with an urgent report (step 420). The urgent report can identify the conflict, and can be sent at a time which differs from a routine reporting schedule.

The standalone computer can determine if a scheduling conflict exists between multiple programs for which the user has made a record request. Typically, when a request is made to record a future program, the current version of the EPG is used to ensure that there is no overlap with a previous request. Each program may have an identifier which allows it to be located in a program guide so that the date and runtime can be determined. However, even if no conflict is detected at the time of the request, a conflict may subsequently arise such as if the broadcast time of a requested program changes. To address this, the standalone computer may perform an additional conflict check when new EPG data is received.

It is also possible for a scheduling analysis to be performed by the web service, such as by using the program schedule server 208 (FIG. 2). This is advantageous as it prevents the PVR from having to upload to the service its EPG selections which indicate, e.g., which services (channels) are available to the PVR for recording, which services the user may have disabled from his EPG view, and so forth.

Additionally, once the computer program (406) is running, it can monitor the PC/PVR health at step 416, such as by monitoring events which are thrown by the standalone computer. Typically, an operating system of a PC sets events when certain situations occur in the computer. For example, an event can be thrown when there is a problem such as a disk error, a software update, or a restart of the operating system, such as due to an intermittent power loss. Another common problem on a PC PVR is that the tuner device fails to work, resulting in an unexpected missed recording of a broadcast video event. For example, the PC is configured to make a recording and is running normally, but the tuner fails to tune and stream any audio/video content to the PC. The events may be stored in a log on the computer. At decision step 418, if a health problem is detected, and the problem is classified as being urgent, then the program reports to the web server with an identification of the urgent condition. In this way, the user can be notified of a problem promptly thus reducing, or eliminating, missed recordings the user was interested in. If the health problem is classified as being non-urgent, it can be reported in the routine report at step 414. The program continues to monitor the PC/PVR health at step 416 to detect any new problems. The classification of a problem as being urgent or non-urgent can be data driven by a server of the notification service. For example, it should provide the PC-PVR with the criteria of which events are to be considered urgent for reporting purposes.

Figure 5:
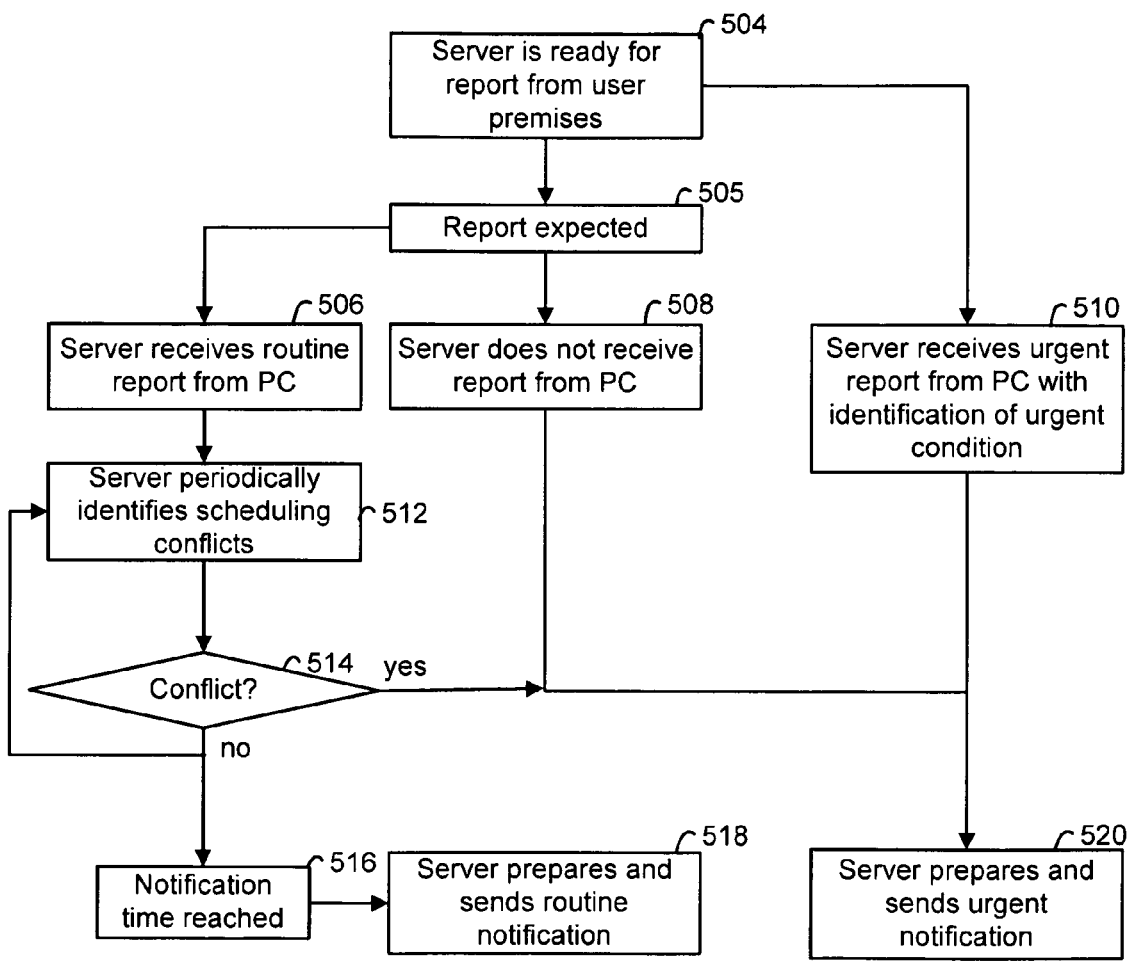
FIG. 5 depicts a process in which a server receives information from a PC/PVR and provides notifications.

FIG. 5 depicts a process in which a server receives information from a PC/PVR and provides notifications. Initially, the web server sets up a user account for a web-based PVR reporting service. The server can receive the user request to sign up for the service along with the entries provided by the user, such as via the user interface 300 of FIG. 3. The server creates an account for the user which has an account identifier and stores the user entries indexed to the account identifier, in one possible approach. The web server negotiates an account identifier, client identifier, notification settings and fail-safe data. The fail-safe data can be provided based on a routine reporting data rate. If the routine rate is x, the fail-safe rate is greater than x, such as 2x). For example, if a report is expected once every hour, the fail-safe rate may be once every two hours, so that an error is declared, if activity does not occur after two hours.

As the user premises equipment reports information to the web server, the web server process the received information. Generally, the information can be reported on a routine basis, such as according to a reporting schedule, or on an urgent basis as appropriate. At decision step 504, the server is ready to receive a report from the user premises. At step 505, a time window is reached in which the report is expected. At the report time, one possible option is that the server receives a routine report from the PC, at step 506. At step 512, the server can periodically identify scheduling conflicts for the programs which were requested to be recorded. For example, updated EPG data at the program schedule server 208 can be accessed for this purpose. At decision step 514, if a conflict is detected, the server prepares and sends an urgent notification to the user, at step 520. At step 516, when the scheduled notification time is reached, the server prepares and sends a routine notification. In another option which follows from step 505, the server does not receive a report from the PC within an expected time window, at step 508. In this case, the server prepares and sends an urgent notification, at step 520. In a third option, regardless of the expected report time, the server may receive an urgent report from the PC which identifies an urgent condition, at step 510, in which case the server responds by preparing and sending an urgent notification, at step 520.

Figure 6:
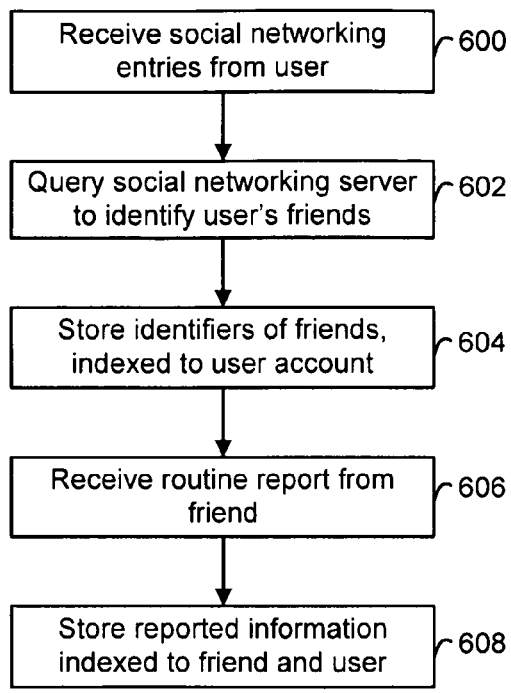
FIG. 6 depicts a process in which social networking information of a user is provided to a server.

FIG. 6 depicts a process in which social networking information of a user is provided to a server. As mentioned previously, the web-based PVR notification service may incorporate social network information of the user. Web-based social network applications allow users to share information with one another. Step 600 includes receiving social networking entries from the user. Step 602 includes querying a social networking server 202 to identify a user's friends, e.g., other users of the social network which a particular user is linked to in a group of users. Such links are typically established voluntarily and are based on shared interests, friendships and so forth. However, the friends need not personally know each other. For example, a friend could be a sports figure or movie star who agrees to be a friend to others in a social network primarily for promotional purposes, for instance. A social network could also include users which are not specifically identified or known by a particular user, such as all users who participate in the notification service in the United States. In this manner, information can be provided such as "the most requested show for next week in the United States is xxx."

Step 604 includes storing identifiers of the friends, indexed to the user's account. For example, these can be account identifiers of the friends, who are also participating in the web-based PVR notification service, and have previously registered with the service. Step 606 includes receiving a routine report from a friend, and step 608 includes storing the reported information, indexed to both the user and the friend. In this way, the user can be notified of the friend's activities, including broadcast programs recorded, recommended and/or downloaded to a portable media player.

Figure 7:
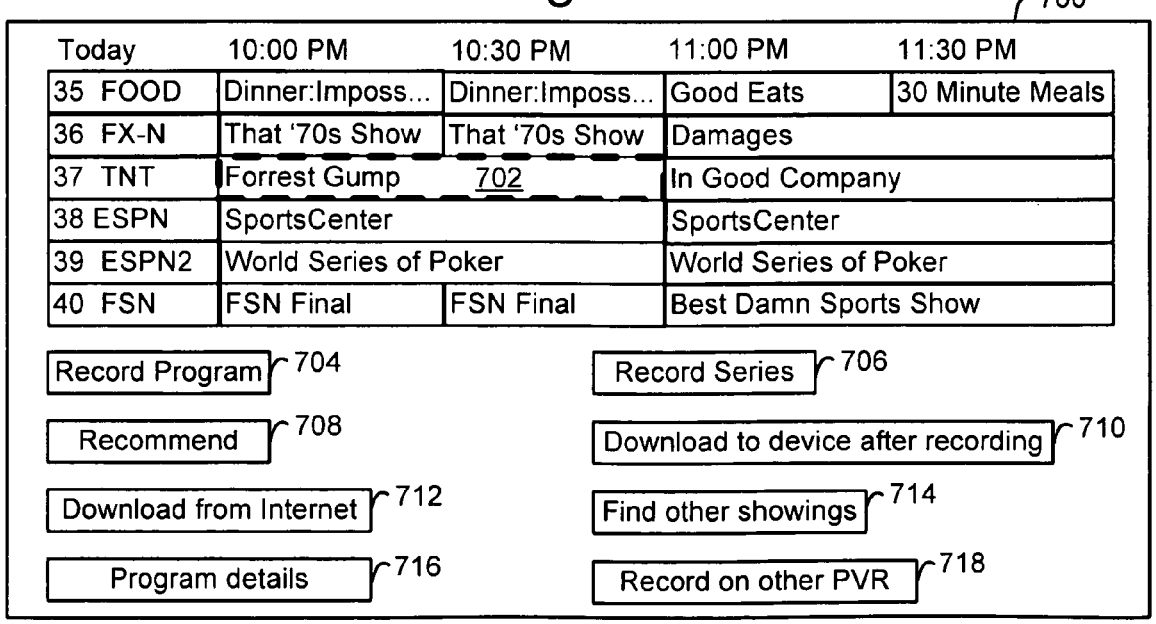
FIG. 7 depicts an example of an electronic program guide (EPG) by which a user can record, recommend and/or download a program.

FIG. 7 depicts an example of user interface 700 by which a user can record, recommend and/or download a program. The user interface provides an electronic program guide (EPG), such as on a TV screen or a PC monitor/display screen, based on EPG data which is downloaded from a server from time to time. The EPG uses a two-dimensional grid to display program content, where one axis denotes the channel and another axis denotes the time axis. Multiple broadcast channels are displayed along the channel axis and multiple time periods are displayed along the time axis. A user navigates the EPG to find the desired content using a remote control device, a mouse or other pointing device. Other possible EPG interfaces include a touch interface which the user can touch, an interface in which the user uses sweeping gestures to navigate, voice navigation and web-cam navigation which observes hand/arm movements, and other styles of pointing devices, such as analog pressure sensitive rocker buttons. Navigation could also involve using a video game console (Xbox) controller joystick and various buttons on the controller to make selections.

Here, the program entry 702 ("Forrest Gump") is highlighted by the user. The user can select from a button 704 to record the next running of the program, a button 706 to record each program in the series, a button 708 to recommend the program to friends in the user's social network, and a button 710 to download the program to a portable media player device after the program is recorded. The recommendation and download request can be stored at the standalone computer and subsequently uploaded to the web server. Preferably the recording requests are uploaded when they are made so that they are online all the time. A local cache copy and a network service copy can be maintained so that if the PC/PVR ceases working, the requests can be restored/fulfilled from the service. Other possible options in the user interface 700 include a button 712 to download a program from the Internet to the PVR, a button 714 to find other showings of a program, a button 716 to obtain program details, and a button 718 to record a program on another other PVR.

EPGs can be provided using a specific terminology in which a broadcast program includes a show and episode number, such as: "'Lost' Episode 1." A series can include a collection of programs, possibly open ended. A season can include a collection of programs in a given season (a season starts at "1" or at a specific year). An event can include a broadcast program at a particular date and time. Furthermore, a recording request can identify a series and a program. Or, a request can be made manually by providing a channel, date and time, keyword or actor. Regarding channels, a service includes a channel, and a lineup includes a collection of services.

FIG. 8*a* depicts an example routine notification, or status report, from a web-based PVR notification service. The display 800 can include a number of different components. For example, the display 800 indicates a time period which the notification relates to, such as a week or a few days (e.g., "This notification covers 2/1/09 to 2/8/09"). The display 800 also includes an advertisement 801 which may be provided based on information which is obtained from the ad server 200 in FIG. 2. The advertisement can be targeted based on recording preferences and previous asset usage patterns for the user that is known by server 204.

Perceived issues for the user can be listed first. For example, a region 802 identifies any programs that were requested to be recorded by the user but were not actually recorded. The scheduled time for recording has passed. The program name is provided in addition to a reason why the program was not recorded. Occasionally, a program that is scheduled to be broadcast at a certain time is not broadcast, such as when other content is broadcast in its place. For example, sometimes a special event will be broadcast in place of a regularly scheduled program. Recording of the program will be unexpectedly missed in such cases. One or more options for obtaining the program are also provided in the region 802. Various options for obtaining the content include a link to a web site where the content can be viewed, either free or for a payment, and a link to a web site for ordering a DVD of the program.

A rescheduling of the next airing of a program can be automatically performed if the PVR misses a recording. The date and time of the rescheduling can be provided in the region 802 as well. Typically, each program has an identifier which can be used to locate the program in a schedule of future programming. Moreover, the alternatives for viewing the content on the web, or ordering a DVD or pay-per-view, can be implemented by cross referencing to the program identifier. The web server 206 can maintain records which associate different programs with different alternative resources for the programs.

Region 803 lists requested programs that will not be recorded. The schedule time for recording has not yet passed, but some problem such as a scheduling conflict has been detected. The user may click on the "Resolve" link to resolve the issue. For example, the screen of FIG. 9 may appear. The display 800 could also show programs that are going to be recorded in the next few days, and provide an option to update settings regarding those programs. For instance, this can include the user electing to not record a program.

In a region 804, the programs that were recorded in the time period covered by the notification are identified, such as by program name and date. A channel identifier could also be provided. A region 805 provides a link which can be selected by the user to provide a new display which identifies programs which have been deleted during the time period. A region 806 provides a link which can be selected by the user to provide a new display which identifies programs which are soon-to-be deleted, and the scheduled deletion date/time. This allows the user to take appropriate steps to save desired content before it is deleted.

The routine notification alternatively might be more streamlined, having more limited information, such as programs in conflict or not recorded, while omitting information such as the list of recorded programs 804 and the links 805 and 806. Any of the information provided in FIGS. 8*a*-10 can be considered to involve recording operations of a PVR.

FIG. 8*b* depicts a further part of the example routine notification of FIG. 8*a*. The user can click on a "next page" link, for instance, to view a further page of the notification. Generally, it is desirable to present the most important issues to the user first, with providing an excessive amount of information at once. In the display 807, a region 808 can provide one or more recommended programs to the user, such as based on the past viewing history of the user. The recommendation may provide a link which the user can select to provide a command to schedule a recording of the recommended program. The date, time and channel of the recommended program may also be provided. When a user selects a link in the notification to record a program, the web server is contacted and can communicate the corresponding instructions to the standalone computer. In this case, if the standalone computer is used to record the programs, it can be updated accordingly to schedule a program to be recorded. If the standalone computer is used with a separate PVR, the standalone computer, after being updated by the server, can communicate with a PVR to instruct it to record the requested program.

A region 810 identifies the most popular programs for the time period of the notification for members of the user's social network. As before, each program may be provided as a link which can be selected by the user to schedule a recording of the next occurrence of the program. Moreover an indication such as an asterisk, font type or color coding, can be provided if the program is already scheduled to be recorded by the user (e.g., "Lost(*)"). A region 812 identifies programs which have been recorded by a particular member of the user's group. This allows the user to find out what a friend has been recording. A region 814 allows the user to find out what a friend has been recommending. Note that the information regarding friends in the social network can be configured by the user via an appropriate user interface. For example, the user may identify particular friends for which the notification will identify recordings and recommendations. Or, a social network can be configured automatically by the service. For example, a social network can be defined to include all users that participate in the service, where the user are grouped by geographic area such as country, state or city, age, gender, or other demographic factors, affiliations with a school, church or social organization, and so forth. For example, the display 807 could indicate which content is most popular among students at a school. Note that it can also be interesting for marketing and advertising reasons for the service to know what content is being sent to portable devices.

FIG. 8c depicts an example routine notification from a web-based PVR notification service where information from multiple PC/PVRs is provided. The interface 820 provides a summary unified notification of programs that were recorded by multiple recording devices at the user's premises. In some cases, the user may have multiple recording devices in the home or other location. Advantageously, each device can be associated with the user's account to provide a unified report of activity for the different devices in one notification. In this case, a region 824 identifies the recorded programs and dates and the corresponding PC/PVR devices on which the programs were recorded. A health status icon for each listed device listed can also be provided. For example, "ok" means no problems with the device have been detected. A "!" icon indicates that a problem with the device has been detected and user attention is needed. Another approach uses color coding such as a green dot for "ok," a yellow dot for a less urgent problem and a red dot for a more urgent problem. A button 826 can be selected by the user to sort the results by the recording device, resulting in the display 830 of FIG. 8d.

FIG. 8d depicts another example routine notification from a web-based PVR notification service where information from multiple PC/PVRs is provided. A region 834 identifies programs that were recorded by a first PC/PVR which is identified as a PVR in a user's family room, a region 836 identifies a second recording device which is a PVR in a child's bedroom, a region 838 identifies a third recording device which is Dad's PC, and a region 839 identifies a fourth recording device which is Home Server PVR. Note that the user can provide the personalized identification information for the different devices using a questionnaire similar to that in FIG. 3, or other appropriate interface. A button 840 can be selected by the user to group the results for all devices, resulting in the interface 820 of FIG. 8c.

Any of the information from the displays of FIGS. 8a-d can be combined as well in a notification. Also, note that the format of the notification can be adapted to the type of message which is used. For example, a cell phone text message might be shorter than an email and have fewer graphics or no graphics, and a voicemail would have a more conversational format and would include introductory comments so the user understands what the voicemail is about.

FIG. 9 depicts an example schedule conflict notification from a web-based PVR notification service. A display 900 includes an advertisement 902 and a region 904 which identifies programs which are in conflict, that is, programs that have been requested to be recorded whose scheduled broadcast times overlap, at least in part. The region 904 identifies the names of the conflicting programs and their scheduled broadcast times. The first program, "MLB Giants versus Dodgers," is scheduled to run on 2/3/09 at 7:00 to 10:00 p.m., and "The Family Guy" is scheduled to run on the same day between 9:00 and 10:00 p.m. Thus, there is an overlap between 9:00 and 10:00 p.m. This information allows the user to adjust the schedule to resolve the conflict, such as by accessing the EPG of FIG. 7. Note that this example is consistent with the region 803 of the display 800 of FIG. 8a, where it stated that the "Family Guy" program will not be recorded because of a conflict. When two programs conflict, one can be chosen over the other automatically to record such as by which program starts sooner.

Alternatively, or additionally, the information in the schedule conflict notification could be provided as part of the routine notification, such as in FIG. 8a

In one option, the conflict can be resolved via the notification. For example, radio buttons 908 can be used to allow the user to select one of the programs to be recorded, thereby deselecting the other program. In this case, there are two conflicting programs, but it is possible to have a conflict with more than two programs. A submit button 906 allows the user to submit the entry. The web server receives the entry and can communicate with the standalone computer to inform it of the conflict, such as when the standalone computer provides its next report to the web server. In this case, if the standalone computer is used to record the programs, it can be updated accordingly to deselect one of the programs to avoid a conflict. If the standalone computer is used with a separate PVR, the standalone computer can communicate with a PVR to instruct it to record only the selected program.

FIG. 10 depicts an example health status notification from a web-based PVR notification service. A display 1000 includes an example advertisement 1002 and a region 1004 which identifies a health problem which has been detected. The region 1004 can identify the problem, and the date and time at which it was detected, from the information which was provided in the report from the user premises equipment. Further, the region 1004 can identify a suggested action for the user. As mentioned, the standalone computer can report health status information such as events which are thrown by the computer, as well as status data from a standalone PVR, such as whether its disk is becoming full.

The web server can correlate each event identifier with an appropriate textual description of the problem which can be presented to the user. In this example, the problem is that the PC has not reported to the server at the scheduled reporting time. This may or may not indicate that a significant problem exists. For example, the PC may have simply been turned off by the user at the time it was supposed to make a report. Or, there may be a problem with the Internet connection of the PC. In this case, the suggested action is for the user to check the PC power to ensure it is turned on and to check the Internet connection. In other cases, a health status notification will include information which is reported by the PC. In the above example, no information was reported. For example, a report can identify the date and time of an event from an event log maintained by the PC. The suggested action can be provided by the web server by cross-referencing an event identifier to a table of suggested actions. For example, an event which specifies a PC disk error may have a suggested action of running an anti-virus utility or a disk defragmentation utility. Further, different health problems can be assigned different levels of importance and color coding, e.g., red for very important, yellow for moderately important, and green for less important. Other icons such as "ok" and "!" could also be used.

Note that the examples of FIGS. 9 and 10 may be combined with information such as provided in FIGS. 8a-d.

Figure 11:
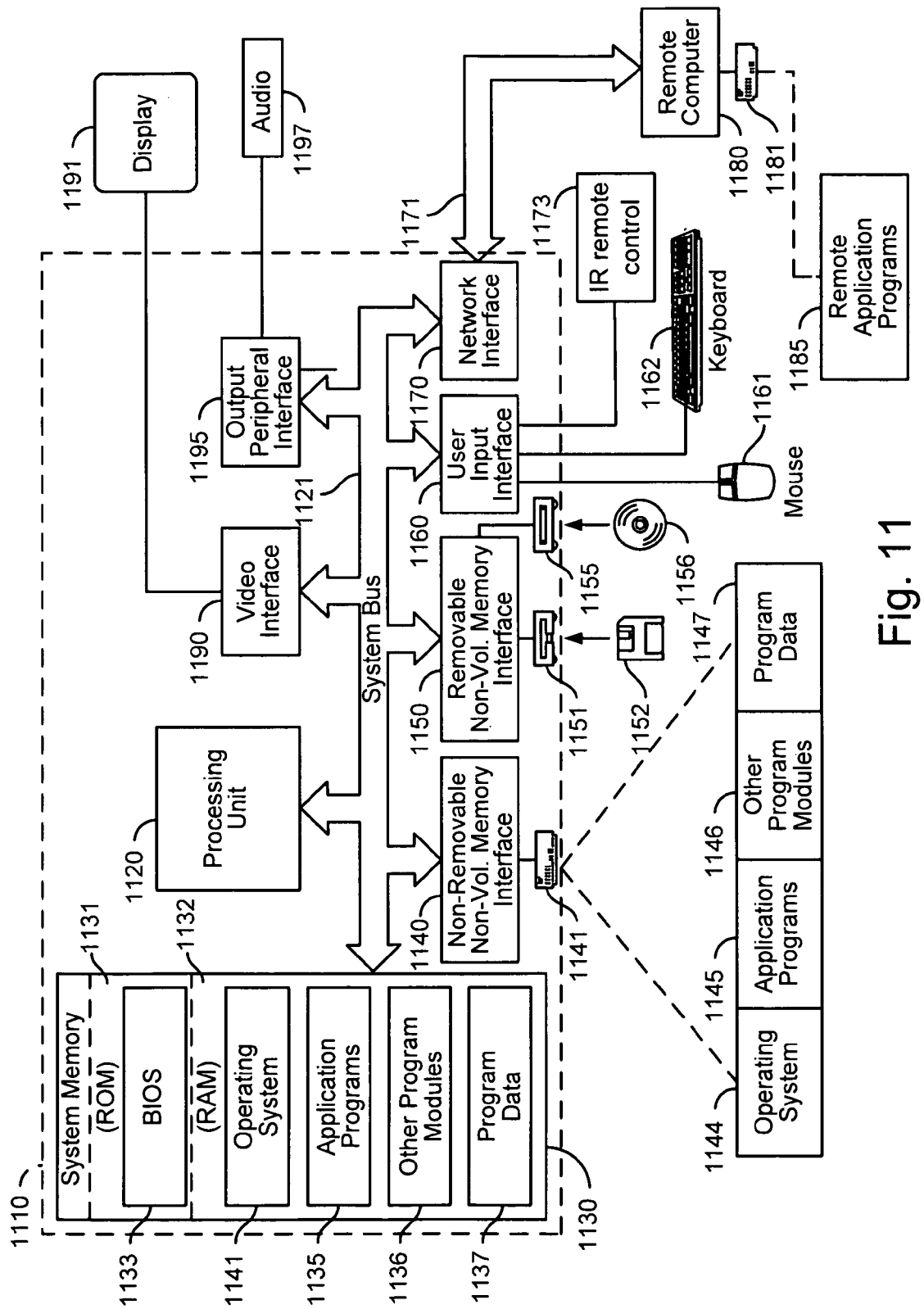
FIG. 11 is an example block diagram of computer hardware suitable for implementing embodiments of the invention.

FIG. 11 is a block diagram of computer hardware suitable for implementing embodiments of the invention. The computer hardware can represent any of the computer devices in FIG. 1, for instance. An exemplary system for implementing the invention includes a general purpose computing device in the form of a computer 1110. The computer 1110 may represent the standalone computer 110 of FIG. 1, for instance. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. By way of example, and not limitation, communication media includes wired media such as a wired network or direct-wired connection, and wireless media such as acoustic, RF, infrared and other wireless media. Combinations of any of the above are also included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. For example, hard disk drive 1141 is illustrated as storing operating system 1144, application programs 1145, other program modules 1146, and program data 1147. These components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information into the computer 1110 through input devices such as a keyboard 1162 and pointing device 1161, commonly referred to as a mouse, trackball or touch pad, and through an IR remote control 1173. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as an audio output 1197 which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated. Such networking environments are commonplace in offices, enterprise-wide computer networks, intranets and the Internet.

When used in a networking environment, the computer 1110 is connected to another network through a network interface or adapter 1170. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A computer-implemented method for providing information regarding broadcast video content, comprising:
   receiving, at a server, via a network connection, a first report of information from a standalone computer, where the first report of information is received according to a reporting schedule, and where the standalone computer manages and communicates locally with a standalone video recorder which records broadcast video content, the first report of information identifying: broadcast video content which has been scheduled to be recorded or has been recorded, a health status of the standalone computer and a health status of the standalone video recorder;
   storing the first report of information at the server;
   accessing, at the server, notification settings associated with a user of the standalone computer and the standalone video recorder; and
   based on the first report of information and the notification settings, providing a routine notification to the user according to a notification schedule, the routine notification provides: a summary of recording operations for the broadcast video content, the health status of the standalone video recorder and the health status of the standalone video recorder;
   receiving at the server, via the network connection, a second report of information from the standalone computer, the second report of information is received on an urgent basis and at a time which is not according to the reporting schedule, the second report of information identifies an urgent problem regarding at least one of the health status of the standalone computer or the health status of the standalone video recorder; and
   based on the second report, providing an urgent notification to the user at a time which is not according to the notification schedule, the urgent notification identifies the urgent problem regarding the at least one of the health status of the standalone computer or the health status of the standalone video recorder.

2. The computer-implemented method of claim 1, wherein the second report of information—indicates that the urgent problem is with the standalone computer.

3. The computer-implemented method of claim 2, wherein: the urgent problem is regarding the health status of the standalone computer and comprises an event which is thrown by the standalone computer.

4. The computer-implemented method of claim 2, wherein: the urgent problem is regarding the standalone computer and comprises a disk error of the standalone computer.

5. The computer-implemented method of claim 2, wherein: the urgent problem is regarding the standalone computer and comprises a software update of the standalone computer.

6. The computer-implemented method of claim 2, wherein: the urgent problem is regarding the standalone computer and comprises a restart of an operating system of the standalone computer.

7. The computer-implemented method of claim 1, wherein: the urgent notification is sent to the user by a communication mode which is selected based on a degree of urgency of the urgent notification, wherein a less urgent notification comprises an immediate email and a more urgent notification comprises a cell phone text message.

8. The computer-implemented method of claim 1, wherein: the first report of information identifies broadcast video content which the user requested to be recorded; and the method further comprising accessing broadcast video content scheduling information to detect a scheduling conflicts; and
   providing an urgent notification to the user at a time which differs from the notification schedule when a scheduling conflict is detected.

9. The computer-implemented method of claim 1, wherein the second report of information indicates that the urgent problem is with the standalone.

10. The computer-implemented method of claim 1, wherein:
    the first report of information identifies broadcast video content which has been recorded by multiple video recording devices; and
    the routine notification provides a unified summary of the broadcast video content which has been recorded by the multiple video recording devices.

11. The computer-implemented method of claim 1, wherein:
    the urgent notification comprises a suggested action for the user, the suggested action comprises at least one of the user checking the network connection or the user checking the standalone computer to ensure it is turned on.

12. A computer-implemented method for providing information regarding broadcast video content, comprising:
    receiving, at a server, user instructions which identify notification settings in a web-based notification service;
    creating an account for the user in response to the user instructions;
    receiving, at the server, via a network connection, a first report of information from a standalone computer, where the standalone computer manages and communicates locally with a standalone video recorder which records broadcast video content, the first report of information identifying: broadcast video content which been scheduled to record or has been recorded, a health status of the standalone computer and a health status of the standalone video recorder;
    accessing the notification settings at the server; and
    based on the first report of information and the notification settings, providing a routine notification to the user which provides: a summary of recording operations of the broadcast video content, the health status of the standalone video recorder and the health status of the standalone video recorder;
    receiving, at the server, via the network connection, an identifier of a problem regarding at least one of the standalone computer and the standalone video recorder;
    determining a suggested action to resolve the problem; and
    providing an urgent notification to the user which provides a description of the problem and the suggested action to resolve the problem, the problem comprises at least one of a disk error, a software update, a restart of an operating system or a failure of a tuner device.

13. The computer-implemented method of claim 12, further comprising:
    assigning a level of importance to the problem; and
    indicating the level of importance in the urgent notification.

14. The computer-implemented method of claim 12, wherein:
    the identifier comprises an identifier of an event, and the urgent notification indicates a date and time the event was set by an operating system of the standalone computer in an event log which is maintained by the standalone computer.

15. The computer-implemented method of claim 12, wherein:

the urgent notification is sent to the user by a communication mode which is selected based on a degree of urgency of the urgent notification.

16. The computer-implemented method of claim 12, wherein:

the problem comprises the disk error; and the suggested action to resolve the problem comprises running at least one of an anti-virus utility or a disk defragmentation utility.

17. A computer readable storage device having computer readable software embodied thereon for programming a processor to perform a method for providing information regarding user premises equipment which records broadcast video content, the method comprising:

at an operating system of the user premises equipment, setting an event when a problem occurs at the user premises equipment, the user premises equipment participates in a web-based notification service, the user premises equipment comprises a standalone computer and a standalone video recorder which communicate with one another via a local communication link, the standalone video recorder tunes a broadcast video content signal and the standalone computer manages the standalone video recorder;

maintaining an identifier of the event in a log;

transmitting, to a server in the web-based notification service, according to a reporting schedule, via a network connection, information from the user premises equipment which identifies broadcast video content which has been scheduled to be recorded or has been recorded by the user premises equipment; and transmitting, to the server, at a time which differs from the reporting schedule, via the network connection, information from the user premises equipment which identifies the event, the event triggers a notification process to a user of the user premises equipment, the notification process provides a notification to the user which identifies the problem and which indicates whether the problem is associated with the standalone video recorder or the standalone computer.

\* \* \* \* \*